(12) United States Patent
Goss et al.

(10) Patent No.: US 11,106,390 B1
(45) Date of Patent: Aug. 31, 2021

(54) COMBINING IN-PROCESS READS TO REDUCE DIE COLLISIONS

(71) Applicant: Seagate Technology LLC, Fremont, CA (US)

(72) Inventors: Ryan James Goss, Prior Lake, MN (US); Daniel John Benjamin, Savage, MN (US); David W. Claude, Loveland, CO (US); Graham David Ferris, Savage, MN (US); Ryan Charles Weidemann, Victoria, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/929,308

(22) Filed: Apr. 24, 2020

(51) Int. Cl.
*G06F 3/06* (2006.01)

(52) U.S. Cl.
CPC .......... *G06F 3/0659* (2013.01); *G06F 3/0614* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,910,099 B1 | 6/2005 | Wang et al. | |
| 7,373,460 B2 * | 5/2008 | Kobayashi | G06F 3/0611 |
| | | | 711/137 |
| 7,386,674 B1 * | 6/2008 | Lango | G06F 3/061 |
| | | | 711/137 |
| 9,164,837 B2 | 10/2015 | Gaertner et al. | |
| 9,400,749 B1 | 7/2016 | Kuzmin et al. | |
| 2003/0204675 A1 * | 10/2003 | Dover | G06F 12/0862 |
| | | | 711/137 |
| 2012/0317365 A1 * | 12/2012 | Elhamias | G06F 12/0862 |
| | | | 711/141 |
| 2018/0129600 A1 | 5/2018 | Ishiyama et al. | |
| 2019/0050161 A1 | 2/2019 | Wysocki et al. | |
| 2019/0138468 A1 | 5/2019 | Li et al. | |
| 2019/0164615 A1 * | 5/2019 | Kim | G11C 16/08 |
| 2019/0384529 A1 * | 12/2019 | Eliash | G06F 3/064 |

FOREIGN PATENT DOCUMENTS

JP   2019073038 A   5/2018

* cited by examiner

*Primary Examiner* — Elias Mamo
(74) *Attorney, Agent, or Firm* — Hall Estill Law Firm (57) ABSTRACT

Method and apparatus for managing data in a storage device, such as a solid-state drive (SSD). In some embodiments, a first read command from a command queue is forwarded to a non-volatile memory (NVM) to request retrieval of a first set of readback data. While the NVM initiates in-process execution of the first read command, an expanded read command is issued to the NVM. The expanded read command supercedes the first read command and requests an expanded set of readback data that includes the first set of readback data as well as a second set of readback data. The second set of readback data may be associated with a second read command in the command queue. The NVM transfers the expanded set of readback data to a read buffer responsive to the expanded read command. The first and second read commands may be client reads, background reads or both.

20 Claims, 7 Drawing Sheets

READ COMMAND (CMD) LIFE CYCLE

READ COMMAND (CMD) FORMAT

FIG. 13

EXPANDED READ COMMAND (CMD) FORMAT

COMBINING IN-PROCESS READS TO REDUCE DIE COLLISIONS

SUMMARY

Various embodiments of the present disclosure are generally directed to a method and apparatus for enhancing performance of a storage device, such as a solid-state drive (SSD).

In some embodiments, a first read command from a command queue is forwarded to a non-volatile memory (NVM) to request retrieval of a first set of readback data. While the NVM initiates in-process execution of the first read command, an expanded read command is issued to the NVM. The expanded read command supercedes the first read command and requests an expanded set of readback data that includes the first set of readback data as well as a second set of readback data. The second set of readback data is operationally proximate the first set of readback data, and may be associated with a second read command in the command queue. The NVM transfers the expanded set of readback data to a read buffer responsive to the expanded read command. The first and second read commands may be client reads, background reads or both.

These and other features and advantages which characterize the various embodiments of the present disclosure can be understood in view of the following detailed discussion and the accompanying drawings.

DETAILED DESCRIPTION

The present disclosure generally relates to the management of data transfer commands in a data storage device, such as but not limited to a solid-state drive (SSD).

Storage devices generally include a controller and a non-volatile memory (NVM). The controller communicates with a host (client) device to direct the storage of user data from the client device to the NVM, and to retrieve and transfer the user data from the NVM to the client device.

Solid-state drives (SSDs) are a popular form of storage device commonly used in current generation storage systems. SSDs use solid-state semiconductor memory, such as NAND flash, as the NVM. A flash memory is usually arranged as a number of flash semiconductor dies that are accessible via channels (lanes).

Data sets are distributed across the various dies to allow parallel processing of client access commands (e.g., read commands, write commands, etc.). Background operations are carried out to enable the SSD to service the client access commands at acceptable performance rates. Background commands can include garbage collection, map updates, calibration operations, etc. Client read commands are usually given priority over client write commands and background commands, at least to a degree.

One or more command queues are maintained to accumulate the commands pending execution. A scheduler function of the controller formats, schedules, and forwards the commands to the flash module in an appropriate order and at appropriate times as the resources necessary to execute the commands become available.

A die collision occurs when a command is issued to a particular set of dies and channels currently being used to execute another operation. With respect to reads, a die collision may result in a read command taking a significantly longer period of time to complete because the die(s)/channel(s) needed to access the requested data are busy servicing a previously issued command.

Various embodiments of the present disclosure reduce the effects of die collisions in a data storage device by implementing an in-process read consolidation technique. While not limiting, it is contemplated that the data storage device will take the form of an SSD with a controller and an NVM, with the NVM arranged as a flash memory having a plurality of dies accessed by parallel channels (lanes). The flash memory may be subdivided into garbage collection units (GCUs), which are separately erased and allocated as a unit.

As explained below, access commands are accumulated by the controller into one or more command queues pending execution. The access commands may include client read and write commands received from one or more client devices, and background read and write commands to support background operations by the storage device.

Each command generally undergoes three successive stages, or intervals, during the life cycle of the command: a pending phase, an execution (in-process) phase, and a completion phase. With respect to a typical client read command, during the pending phase the read command is received from a requesting client and accumulated in an associated command queue. During the in-process phase, the scheduler formats and forwards the read command to the flash, and the flash operates to service the read command by retrieving the requested readback data associated with the read command. During the completion phase, the controller performs the necessary operations to transfer the buffered readback data to the requesting client. The in-process phase generally begins once the command is ready to be forwarded to the flash for execution, and ends once the requested readback data have been successfully decoded and placed in a read buffer.

The controller may implement various types of command consolidation during each of these phases to enhance processing efficiencies. During the pending phase, multiple pending read or write commands may be combined into a larger, consolidated command which is forwarded to the flash as a single command. During the completion phase, the controller may consolidate client notifications and/or readback data transfers across a host interface to the requesting client.

Of particular interest is in-process read consolidation, which takes place during the in-process phase. As explained in detail below, in-process read consolidation is generally carried out as follows: during the execution of each read command, a monitoring function monitors for the presence of one or more additional read commands that have operational proximity to the current in-process read command. The additional read commands may be client read commands, background read commands, or a combination of both.

If the required amount of operational proximity is detected, the controller forwards a specially configured read command to the flash. The specially configured read command is sometimes referred to as an expanded read request.

The expanded read request causes the flash to expand the in-process read range to recover and return an expanded set of readback data. The expanded set of data will encompass the requested data from the initial in-process read command, as well as additional readback data associated with one or more additional read commands.

In this way, the data for multiple pending commands can be pulled all at once from the flash memory without substantially extending the time required to access the data. Some of the retrieved data may take the form of speculative data not specifically associated with a pending client read command or required background read command. The speculative data may be jettisoned or retained to support the possibility of a cache hit. The technique reduces die collisions and enhances client I/O performance since the resources required to carry out the additional commands are already allocated for use by the in-process read command.

The operational proximity among the respective read commands can be defined and evaluated in a number of ways depending on the requirements of a given application. Examples can include readback data from the same die/channel set, plane, GCU, page (or adjacent pages), outercode sets, etc. Logical proximity can be a factor in some cases, particularly in a sequential write environment. In further cases, the expanded readback data set constitutes all of the data that can be retrieved efficiently from the associated location of the memory, such as all of the data on a selected page or group of pages, all of the data in a parity set, etc. A search range module can be used to define a search range for each read command forwarded to the flash, and the controller can determine if any pending read commands request data within the search range for the in-process read command.

While some embodiments allow the storage device to perform consolidation of read commands both during the pending phase (e.g., prior to the forwarding of the commands to the flash) as well as during the in-process phase (e.g., once the commands have been forwarded to the flash), this is not required or considered optimum. Rather, in other embodiments the in-process consolidation techniques disclosed herein eliminate the need for, and supersede, any such consolidation during the pending phase. That is, instead of delaying or otherwise holding up read commands in order to form consolidated reads, the various embodiments presented herein forward the commands for processing as expeditiously as possible and look for opportunities based on other pending reads to expand the data pull. This provides a more efficient and targeted approach.

Figure 1:
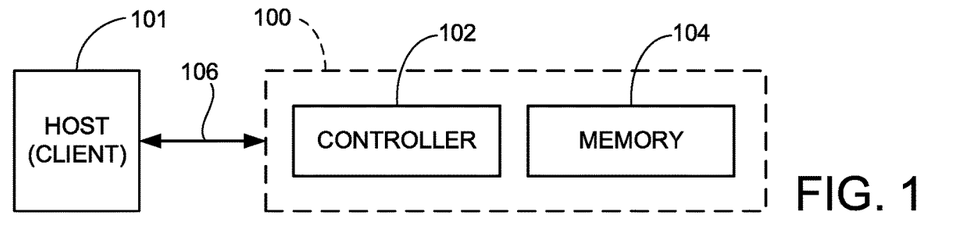
FIG. 1 provides a functional block representation of a data storage device constructed and operated in accordance with various embodiments of the present disclosure.

These and other features and advantages of various embodiments can be understood beginning with a review of FIG. 1 which provides a functional block representation of a data storage device 100. The storage device 100 is coupled to a host (client) device 101.

The storage device 100 includes a controller 102 and a memory 104. The controller 102 provides top-level control of the memory 104 and processes communications with the client 101. The memory 104 provides non-volatile memory (NVM) for the storage of user data from the client. The controller 102 may be a programmable CPU processor that operates in conjunction with programming stored in a computer memory within the device. The controller may alternatively be a hardware controller. Commands and data are transferred between the client device and the storage device using a suitable host interface 106.

Figure 2:
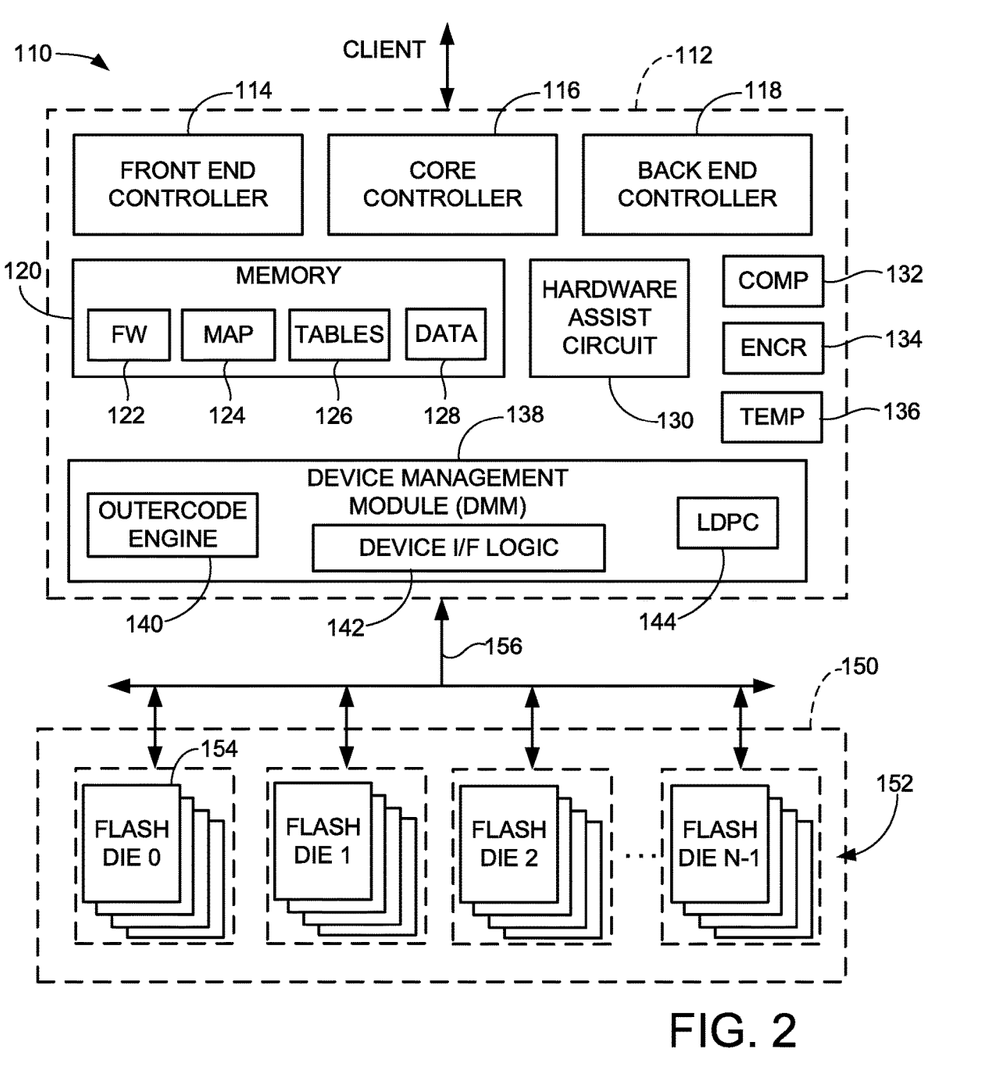
FIG. 2 illustrates the device of FIG. 1 characterized as a solid-state drive (SSD) in accordance with some embodiments.

FIG. 2 describes relevant aspects of an exemplary data storage device 110 corresponding to the device 100 of FIG. 1. The device 110 is a solid-state drive (SSD) that communicates with one or more client devices via one or more Peripheral Component Interface Express (PCIe) ports. The NVM comprises 3D NAND flash memory, although other forms of memory can be used.

In at least some embodiments, the SSD 110 operates in accordance with the NVMc (Non-Volatile Memory Express) specification, which enables different users to allocate NVM sets (die sets) for use in the storage of data. Each die set may form a portion of an NVMe namespace that may span multiple SSD, or be contained within a single SSD. Each NVMe namespace will be owned and controlled by a different user (owner).

The SSD 110 includes a controller circuit 112 that corresponds to the controller 102 in FIG. 1. The controller circuit 112 has a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. A controller memory 120 represents various forms of volatile and/or non-volatile memory (e.g., SRAM, DDR DRAM, flash, etc.) utilized as local memory by the controller 112. Various data structures and data sets may be stored by the memory including loaded firmware (FW) 122, map data 124, table data 126 and user data 128 in read/write buffers temporarily cached during host data transfers.

A non-processor based hardware assist circuit 130 enables the offloading of certain memory management tasks by one or more of the controllers as required. A data compression block 132 applies lossless data compression to input data sets during write operations to enhance storage efficiency. An encryption block 134 applies cryptographic processing such as encryption/decryption to provide data security for the SSD. A temperature block 136 uses one or more temperature sensors to monitor and record temperatures of the SSD during operation.

A device management module (DMM) 138 supports back end processing operations of the SSD. The DMM includes an outer code engine circuit 140 to generate outer code, a device I/F logic circuit 142, and a low density parity check (LDPC) circuit 144 configured to generate and use LDPC codes as part of an error detection and correction strategy to protect the data stored by the SSD. A memory module 150 is coupled to the controller 112 via the DMM 138. The memory module 150 corresponds to the memory 104 in FIG. 1, and includes a non-volatile memory (NVM) in the form of a flash memory 152 distributed across a plural number N of flash memory dies 154. Flash memory control electronics (not separately shown in FIG. 2) facilitate parallel data transfer operations via a plural number M channels (lanes) 156. In one embodiment, the flash memory 150 has 256 dies 154 (e.g., N=256) serviced by 8 channels 156 (e.g., M=8) so that 32 dies are coupled to each channel. Only one die can be accessed by each channel at a time, although up to eight dies can be accessed in parallel at a time using all eight channels. Other arrangements can be used.

While not limiting, modern SSDs and other data storage device systems are often formed from integrated memory modules such as 104, 150 that are commercially available from a source of such devices. The memory modules are integrated into an SSD by a device manufacturer which supplies the controller functions in a separate controller 102, 112. The controller may be a single integrated circuit such as in the case of a system on chip (SOC) design, or a grouping of integrated circuits.

In this arrangement, the controller and memory modules are separate operational entities which communicate across one or more internal command and data interfaces. A pull system is commonly used in which the controller issues commands to the memory, and then repetitively sends status inquiries to the memory to determine whether the commands have been completed.

Once the memory signals that a particular command has been completed, the controller may issue additional commands to the memory. For example, when the memory sends a command complete status for a read command, the controller may send a data transfer command to cause the memory to transfer the recovered data to the controller. While any number of different schemes can be employed to handle the interactions between the controller and the memory, it will be noted at this point that the various embodiments presented herein are particularly directed to improvements in the command and data exchanges between the controller and the memory.

Figure 3:
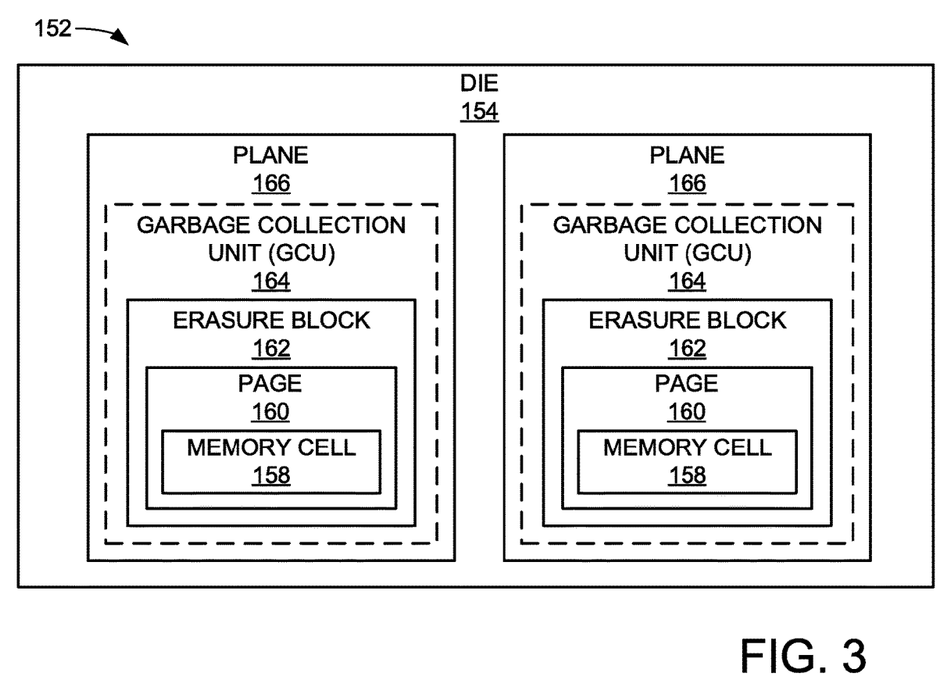
FIG. 3 shows a physical and logical layout of a flash die from FIG. 2 in some embodiments.

FIG. 3 shows a physical/logical arrangement of the various flash memory dies 154 in the flash memory 152 of FIG. 2 in some embodiments. Each die 154 incorporates a large number of flash memory cells 158. The cells may be arrayed in a three-dimensional (3D stacked) arrangement with various control lines (e.g., source, bit, word lines) to access the cells.

Groups of cells 158 are interconnected to a common word line to accommodate pages 160, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), 4LCs (four-level cells with four bits per cell), and so on. Generally, n bits of data can be stored to a particular memory cell 158 using 2n different charge states (e.g., TLCs use eight distinct charge levels to represent three bits of data, 4LCs use sixteen distinct charge levels to represent four bits of data, etc.). The storage size of a page can vary; some current generation flash memory pages are arranged to store 32 KB (32,768 bytes) of user data plus associated LDPC code bits.

The memory cells 158 associated with a number of pages are integrated into an erasure block 162, which represents the smallest grouping of memory cells that can be concurrently erased in a NAND flash memory. A number of erasure blocks 162 are incorporated into a garbage collection unit (GCU) 164, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle (garbage collect) the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 164 nominally uses a single erasure block 162 from each of a plurality of dies 154, such as 32 dies. The dies in a given GCU may be affixed to a single channel 156, or spread across multiple channels (see FIG. 2).

Each die 154 may further be organized as a plurality of planes 166. Examples include two planes per die as shown in FIG. 3, although other numbers of planes per die, such as four or eight planes per die can be used. Generally, a plane is a subdivision of the die 154 arranged with separate read/write/erase circuitry such that a given type of access operation (such as a write operation, etc.) can be carried out simultaneously by each of the planes to a common page address within the respective planes.

Figure 4:
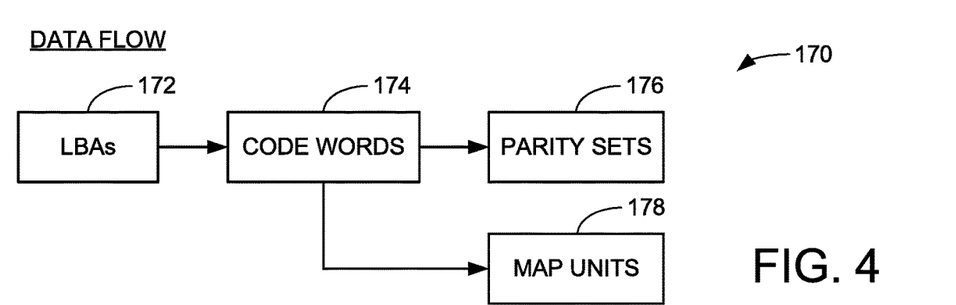
FIG. 4 illustrates a data flow for data stored by the SSD.

Input data from a client device such as 101 are processed in a manner illustrated by a data flow sequence 170 in FIG. 4. Other arrangements can be used. Blocks of data with associated logical addresses are presented at 172. The logical addresses may be logical block addresses (LBAs), but other forms can be used including key values, virtual block addresses, etc. The blocks are arranged into code words 174, which include user data bits and error correction code (ECC) bits to facilitate recovery during a read operation. The ECC bits may take the form of LDPC (low density parity check) bits.

A selected number of the code words are arranged into pages, and a selected number of pages are arranged into parity sets 176. In one non-limiting example, 31 pages of code words are combined using a suitable combinatorial function (e.g., exclusive or, XOR) to generate a parity value as a $32^{nd}$ page, and then all 32 pages of the parity set is written to a selected GCU. The parity value operates as outer code. Using a GCU size of 32 erasure blocks with one erasure block from each die, the outer code can facilitate data recovery even in the instance of a single die failure. Other forms of outer code, such as Reed Solomon codes, can be used as desired.

For mapping purposes, groups of the code words 174 are further arranged into map units 178. Map units represents groupings that enable the mapping system of the SSD to locate and retrieve the code words stored to the flash memory.

Figure 5:
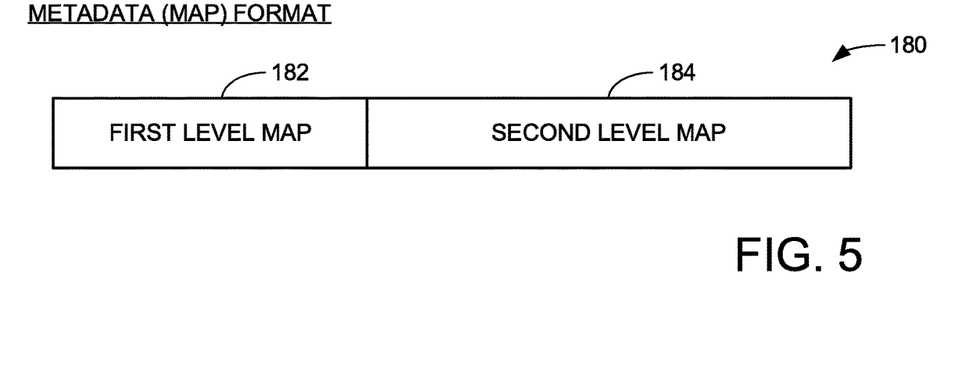
FIG. 5 is a format for map metadata used by the SSD.

A two level map 180 is represented in FIG. 5. Other mapping structures can be used including a single level map, a multi-level map with more than two levels, etc. The map 180 is metadata that includes a first level map 182 and a second level map 184. The second level map 184 operates as a flash transition layer (FTL) with a physical to logical association of addresses to enable location of the desired user data blocks. The first level map 182 generally indicates the locations of map descriptors that in turn identify the locations of the map units 178 in the second level map 184. Some, most or all of the first and second level maps 182, 184 may be loaded to local memory for use by the controller 112.

A typical data access sequence to service a client data transfer command may include accessing the first level map to identify the appropriate entry in the second level map, and accessing the second level map to identify the location in flash where the associated user data blocks are located. In the case of a read operation, the user data blocks are retrieved for further processing and return to the requesting client; in the case of a write operation, the new data blocks are written to a new location, and the metadata are updated. Maintaining accurate map metadata is generally necessary to enable the SSD 110 to accurately identify the current state of the system, and reliably service client access commands. Protection schemes such as error correction coding, redundant copies, etc. are applied to ensure the integrity of the map metadata.

Figure 6:
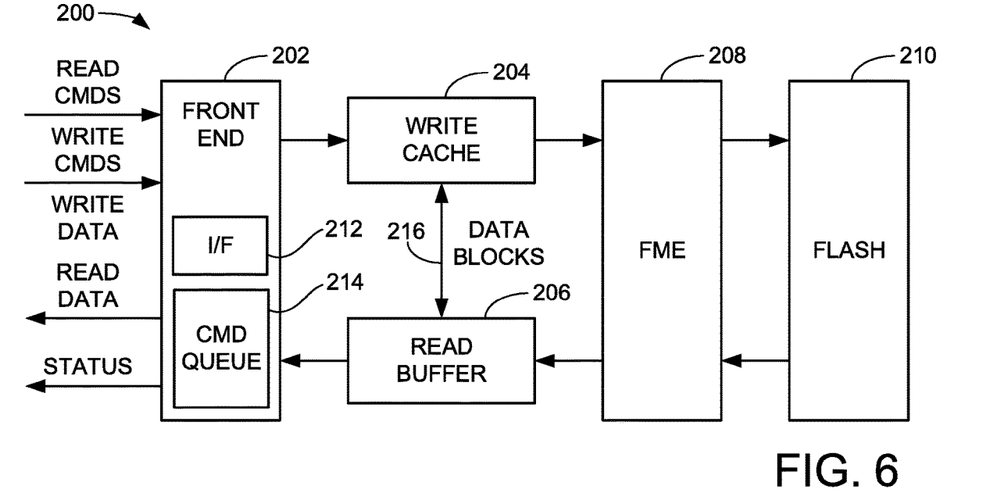
FIG. 6 depicts data paths through the SSD during the servicing of client access (read and write) commands in some embodiments.

FIG. 6 is a functional block representation of data path circuitry 200 of the SSD 110 in accordance with some embodiments. The circuitry 200 includes a front end 202, a write cache 204, a read buffer 206, flash memory electronics (FME) 208, and flash memory 210. The front end 202 interfaces with one or more client devices 101 (FIG. 1) using an interface (I/F) circuit 212. Pending access commands are stored in one or more command queues 214.

During normal operation of the SSD 110, the client(s) will issue various access commands including read and write commands. Each client read command will constitute a request for some logical range (e.g., LBA range) of blocks to be retrieved from flash 210. Each client write command will constitute a request to store some logical range of blocks to the flash, and will be accompanied by a transfer of the associated writeback data from the client to the storage device.

The front end 202 processes these and other commands and arranges the respective read and write commands into one or more of the command queues 214 pending execution. The writeback data are stored in the write cache 204 and are subjected to processing as described above in FIG. 4 to arrange the writeback data into code words, pages, parity sets, etc. Additional processing may be applied as well, such as encryption and compression.

At such time that a command scheduler (not separately shown) of the controller 112 selects the next command to be serviced, the associated command/data are forwarded to the FME (flash memory electronics) 208, which in turn directs the same to the flash 210. The FME 208 is a rudimentary front end on each die or set of dies and serves to direct commands and data to the local read/write/erase circuitry of the respective planes. In the case of a write command, the writeback data are written to the next set of available pages 160 in an allocated GCU 164 (FIG. 3). In the case of a read command, the data are retrieved, subjected to error correction and other signal processing steps, and placed in the read buffer. The map metadata are accessed and updated as required during these operations.

Client read commands tend to receive priority over other commands, including client write commands and background commands, on the basis that the client is likely waiting for the requested readback data before it can proceed with subsequent processing steps. At the same time, the command scheduler function of the controller needs to execute the background operations (e.g., garbage collection, map updates, calibrations, etc.) at a sufficient rate to enable the storage device to continue to service the client access commands at acceptable performance levels. Another complicating factor is that the various competing pending commands and background operations may require the use of shared resources that have to be made available before the next command can be carried out. These resources can include data buffers, decoders, encryption/decryption circuitry, lanes, dies, registers, map data, etc.

Continuing with FIG. 6, the front end 202 provides various statuses to the client, including command complete statuses when commands are completed. For completed read commands, the command complete status may indicate that the requested readback data have been successfully retrieved and are now available for transfer from the read buffer 206. If writeback caching techniques are employed, the front end 202 may proceed to issue a write command complete status to the client, even if the writeback data are still pending in the write cache 204 and have not yet been written to the flash 210. To this end, the write cache 204 may take the form of NVM, such as NAND or NOR flash, although such is not necessarily required. The read cache 206 may normally be volatile memory, such as DRAM, since the readback data in the read cache can always be re-read from the non-volatile flash if required. In some cases, data blocks may be internally transferred between the write cache 204 and the read buffer 206, as indicated by internal data path 216.

Figure 7:
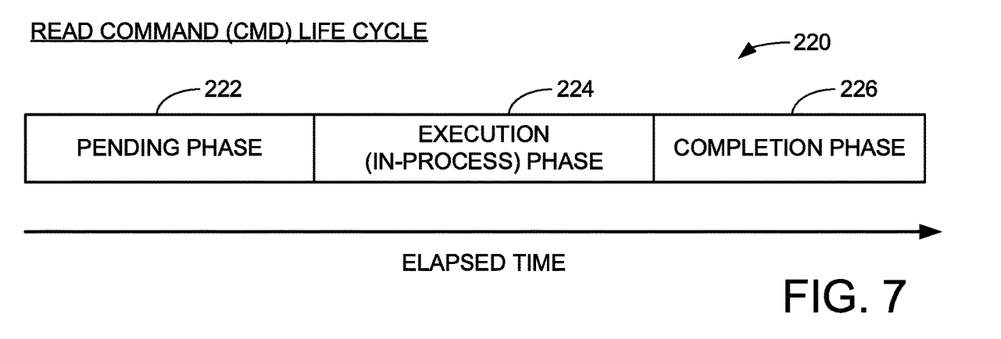
FIG. 7 shows a life cycle for a typical read command processed using the data paths of FIG. 6 in some embodiments.

FIG. 7 shows a life cycle 220 for each command processed by the respective data paths of FIG. 6. Each command generally undergoes three successive stages, or intervals: a pending phase 222, an execution (in-process) phase 224, and a completion phase 226. These respective phases apply to both client commands and background commands, although the processing carried out by each phase will be different depending on the type of command.

Of particular interest is the manner in which client read commands are handled, and so FIG. 7 will be discussed using a client read command as an example. Initially, the client read command is transferred by a requesting client over the host interface (e.g., 106, FIG. 1) to the storage device, which acknowledges receipt of the command. At this point, the read command enters the pending phase 222.

The pending phase relates to the first part of the command processing sequence, and generally involves placement of the associated read command into a suitable command queue (e.g., 214, FIG. 6) pending execution. Various preprocessing steps may be needed before the pending command can be advanced to the execution phase, such as the retrieval of the associated map data to locate the most current version of the requested data in the flash 210. Depending on the map management structure, one or more metadata read commands may be scheduled and performed to retrieve portions of the first or second level map before the queued read command can be executed.

The execution (in-process) phase 224 relates to those steps that are carried out to execute the read command. Steps include formatting the read command for use by the flash memory, transfer of the formatted read command to the flash, retrieval of the requested readback data from the associated location, and various decoding steps (e.g., LDPC decoding, decompression, decryption, etc.) upon the retrieved data. While not limiting, it is contemplated that the in-process phase 224 is completed once the requested data have been successfully decoded and are now resident in the read buffer (206, FIG. 6).

The completion phase 226 relates to post-processing steps that are carried out upon the retrieved readback data. This may include using the controller to notify the requesting client that the readback data are ready, and to transfer the readback data to the client device over the host interface. It will be noted that background reads will be processed in a similar fashion as client reads, except that the retrieved readback data are used to support some internal operation such as a read-modify-write, garbage collection, data relocation, a cryptographic function, etc.

In some embodiments, the controller 112 (FIG. 2) may be configured to consolidate commands during each of these respective phases. For example, during the pending phase 222, read or write operations having data with logical or physical proximity may be combined or otherwise grouped together for execution as a single, consolidated command. During the completion phase 226, the controller may combine client notifications and/or data transfers to a particular client for readback data associated with multiple client read commands.

Figure 8:
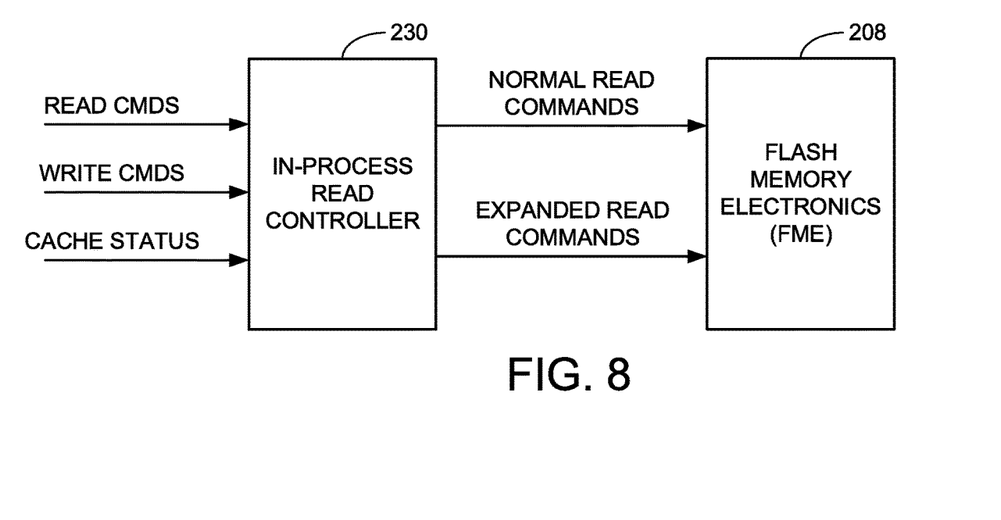
FIG. 8 is a functional block representation of an in-process read controller of the SSD constructed and operated in accordance with various embodiments of the present disclosure.

Of particular interest to the present discussion are consolidation operations that take place during the execution (in-process) phase 224 of FIG. 7. As shown by FIG. 8, an in-process read controller 230 operates to consolidate and expand certain in-process read commands. The in-process read controller (hereinafter "read controller") 230 forms a portion of the controller 112 and operates as a background routine during normal command scheduling and processing. The read controller 230 communicates with the FME 208 of FIG. 6 to forward both normal read commands and specially configured (expanded) read commands to the FME.

Figure 9:
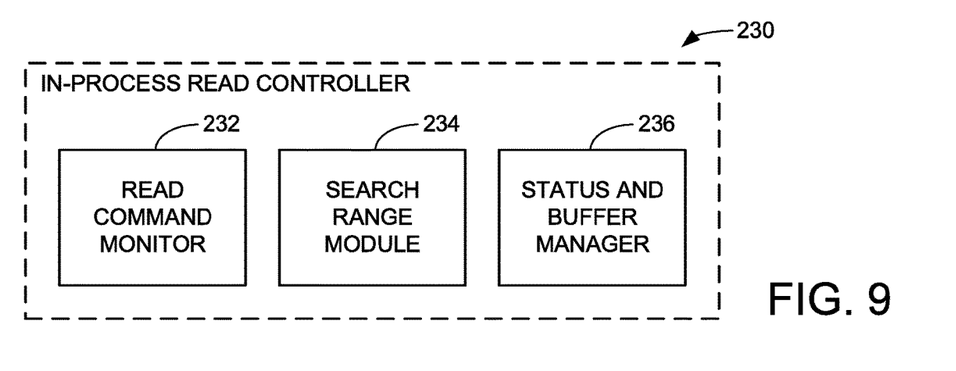
FIG. 9 shows the read controller of FIG. 8 in greater detail.

FIG. 9 shows the in-process read controller 230 in accordance with some embodiments. The read controller 230 includes a read command monitor circuit 232, a search range module circuit 234 and a status and buffer manager circuit 236. These functions can be realized using hardware or firmware. The read command monitor circuit 232 operates to track the issuance of new read commands to the command queue. The new read commands may be additional read commands that are issued by a client, or may be background read commands that are generated to support a background operation.

The search range module circuit 234 operates to evaluate an operational proximity for each in-process read command with each of the other commands that have been presented to the command queue(s). In some cases, the search range module circuit 234 can initiate a search of the queues each time that a read command is formatted and enters the in-process phase (224, FIG. 7).

The status and buffer manager circuit 236 operates to track the status of each read command, including tracking the issuance of the expanded read requests and the associated readback data that is obtained.

Figure 10:
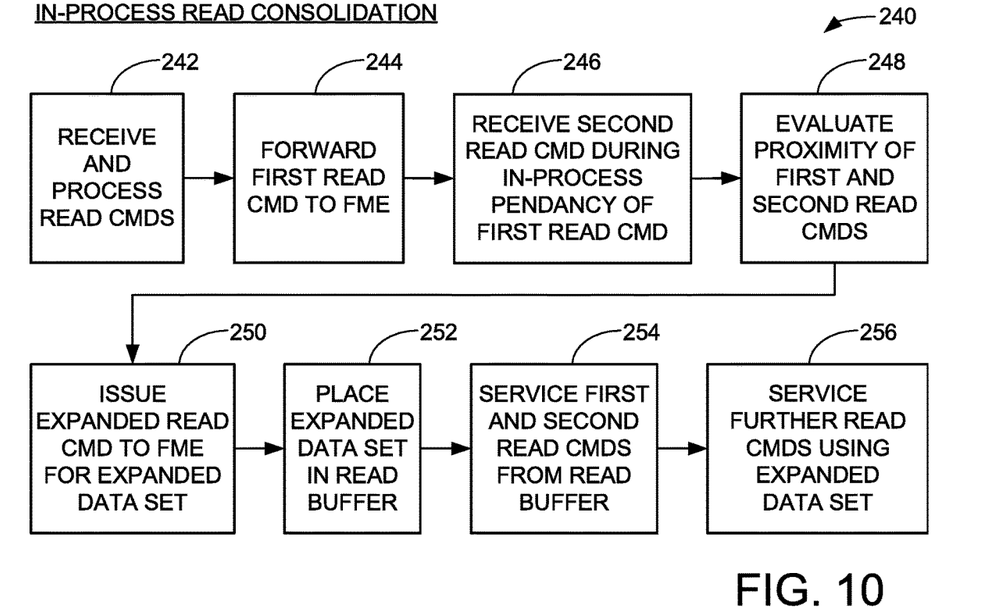
FIG. 10 is a sequence diagram to demonstrate the consolidation of in-process reads by the read controller of FIG. 8.

FIG. 10 provides a sequence diagram for an in-process read consolidation routine 240 in accordance with some embodiments. The routine 240 describes the operation of the read controller 230 during normal operation of the SSD 110.

At block 242, various read commands are generated and queued. Processing is applied as described above to prepare the read commands for execution. Depending on the operational environment, this can include identifying the target address location at which the most current version of the data resides in flash, identifying the resources needed to execute the command, authenticating the command as coming from an authorized client or user, placing the command into an appropriate form for receipt and processing by the FME 208, etc.

As desired, if multiple pending commands are found to be sufficiently close in operational proximity to justify combining into a larger, consolidated command, these operations can be carried out during this block as well prior to the formatting of the commands. Such pre-combining of commands is not necessarily required, however; instead, each pending read command may be separately evaluated and formatted, with the system relying on in-process consolidation as a more efficient strategy.

The formatted read commands are thereafter issued to the FME for execution, block 244. In the present example, a particular read command, referred to as a first read command (cmd), will be considered, it will be appreciated that at this point, the first command is an in-process command.

At block 246, a second read command is received or otherwise generated. The second read command can be a read command from a client or an internally generated background read command. The operational proximity between the second read command and the first read command is evaluated at block 248 during the continued pendancy of the first command.

Operational proximity can be evaluated in a number of ways. The second read command may overlap or encompass the readback data in the first command, or may be logically proximate, in other cases, the second read command may be unrelated to the first command, but the readback data associated with the second read command are physically proximate to the target location being accessed by the first command. Other considerations for operational proximity will be discussed below.

Provided that there is sufficient operational proximity between the first and second commands, an expanded read command (request) is issued at block 250. The expanded read command is issued after the FME has received the first command and prior to the FME completing the servicing of the first command. The expanded read command causes the FME to expand the amount of readback data that is returned with the first command. This amount of readback data is referred to as an expanded data, set.

The expanded data set is transferred to the read buffer at block 252, which ends the in-process phase for the associated commands. The respective first and second commands are completed during step 254. This may include issuing a notification to the client(s) that the recovered data sets are ready for transfer, as well as enacting a transfer of the data sets to the requesting client(s). As noted above, a combined notification or data transfer may take place as required. If the retrieved data are associated with a background read, an internal operation is carried out using the retrieved readback data.

Finally, to the extent that the expanded data set includes additional data not associated with the first or second commands (e.g., speculative data), such speculative data may be retained in the read buffer as well, block 256. This allows the possibility of cache hits for any subsequent read commands that are either issued by a client or generated internally. While the retrieval of speculative data sets are contemplated, such are not necessarily required. The retrieved speculative data will be retained in the read buffer using suitable processing rules.

Figure 11:
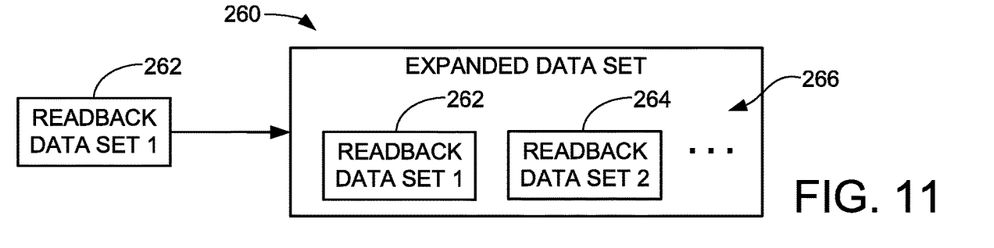
FIG. 11 illustrates the consolidation of sets of readback data by the read controller in some embodiments.

FIG. 11 is a simplified diagram to illustrate an expanded data set 260 obtained during the sequence of FIG. 10. The data set 260 incorporates a first readback data set (readback data set 1) 262 and a second readback data set (readback data set 2) 264. The first set 262 is associated with the first command and the second set 264 is associated with the second command. Additional speculative data (if any) is represented by additional area 266.

Figure 12:
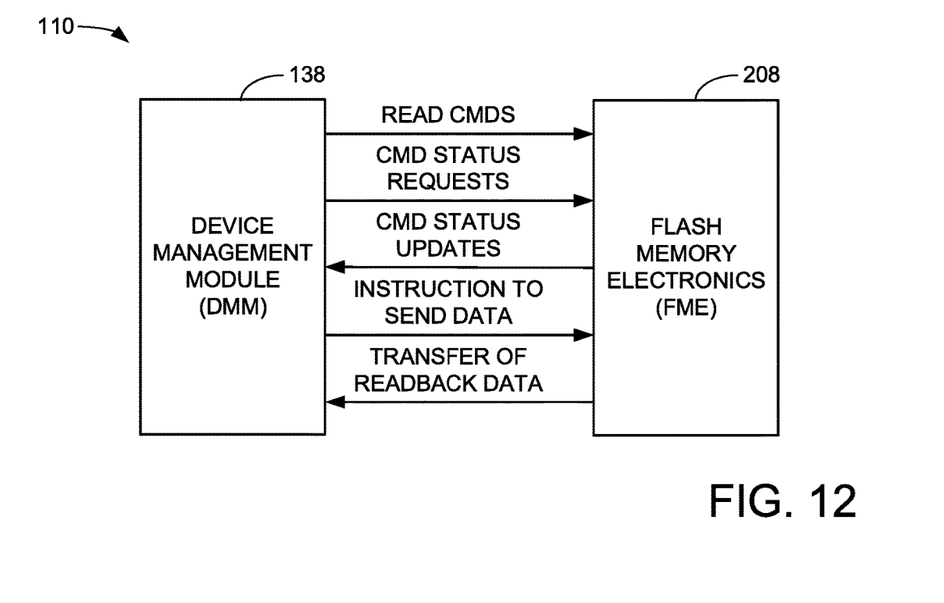
FIG. 12 depicts device management module (DMM) and flash memory electronics (FME) circuitry of the SSD operative responsive to the read controller.

FIG. 12 shows the device management module (DMM) 138 of FIG. 2 in communication with the FME 208 of FIG. 8. Various command and data exchanges are carried out between these respective circuits under the direction of the read controller 230. As noted previously, the SSD 110 uses a pull system so that the MME issues commands to the FME, and follows up with status inquiries to determine whether the issued commands have been completed. When the FME signals that a selected command is completed, the MME subsequently issues a data transfer command as required.

Accordingly, communications from the DMM 138 will include the forwarding of read commands (including normal read commands and expanded read commands), follow up status requests, and instructions to forward data. Communications from the FME 232 will include status updates (including indications that commands are not complete and indications that commands are complete), and the transfer of the requested readback data sets.

Figure 13:
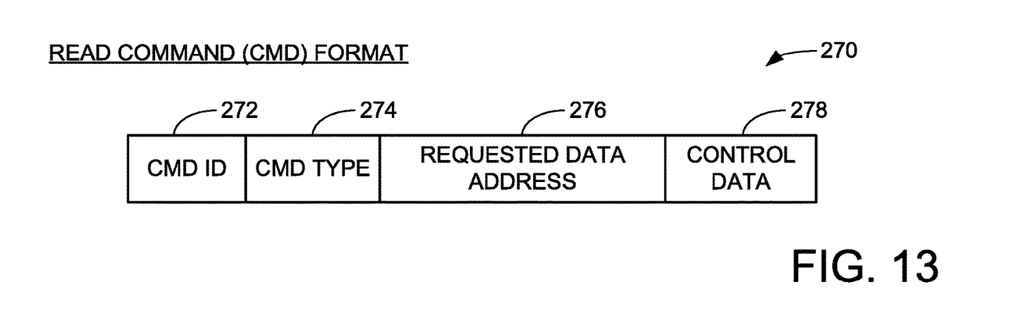
FIG. 13 shows an exemplary format for a standard read command.

FIG. 13 shows an exemplary format for a normal (e.g., in-process) read command 270 issued by the DMM to the FME. The format is merely illustrative and is not limiting, so that other formats can be used depending on the requirements of a given application. Each normal read command includes a command identification (ID) value 272, a command type 274, an address for the requested data 276 and other control data 278. Briefly, the command ID is a unique identifier for the associated command, the type identifies the type of command (e.g., write, read, status request, etc.), the address identifies the target address for the read command (e.g., die, plane. GCU, page, bit offset, etc.), and the control data represents any other data associated with the command. System level identifiers (e.g., LBAs, code words, etc.) for the requested data blocks (e.g., MUs, etc.) are not separately shown, but may form a portion of the address information.

Figure 14:
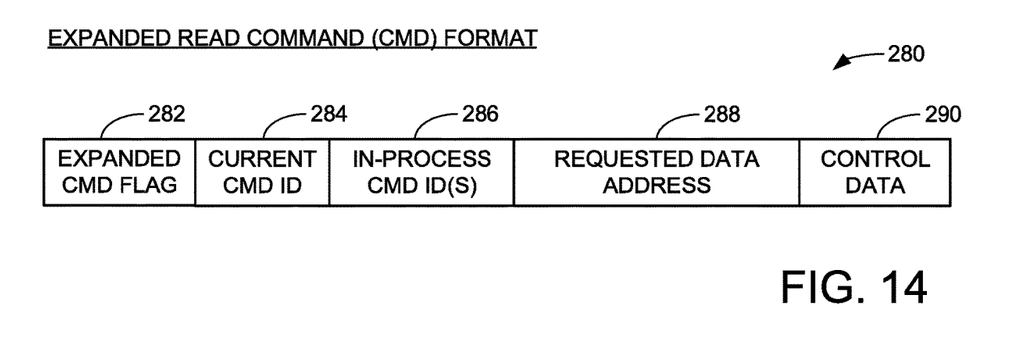
FIG. 14 shows an exemplary format for an expanded read command.

FIG. 14 shows an exemplary format for an expanded read command 280 issued by the DMM to the FME. As before, this is merely for illustration purposes and is not limiting. The expanded read command 280 includes an expanded command flag 282, a current command II) 284, an in-process command ID 286, a requested address 288 and control data 290. Other information may be incorporated into the command as well.

The expanded command flag 282 may be a single bit or multiple bits that signify the command as an expanded in-process read command. In this way, the FME will understand that the expanded read command supersedes the first read command, and the FME will provide a command complete status for the expanded command without providing a separate command complete status for the first command.

The current command ID 284 is a unique command identifier for the expanded read command. The in-process command ID 286 identifies the previous in-process read command, or commands, that are expanded by this expanded command, such as the in-process read command in FIG. 13. The requested data address 288 identifies the data to be pulled; this may be in addition to the originally requested data in the previous command, or it may represent all of the data that is to now be pulled. The control data 290 provides additional useful information as required.

Figure 15:
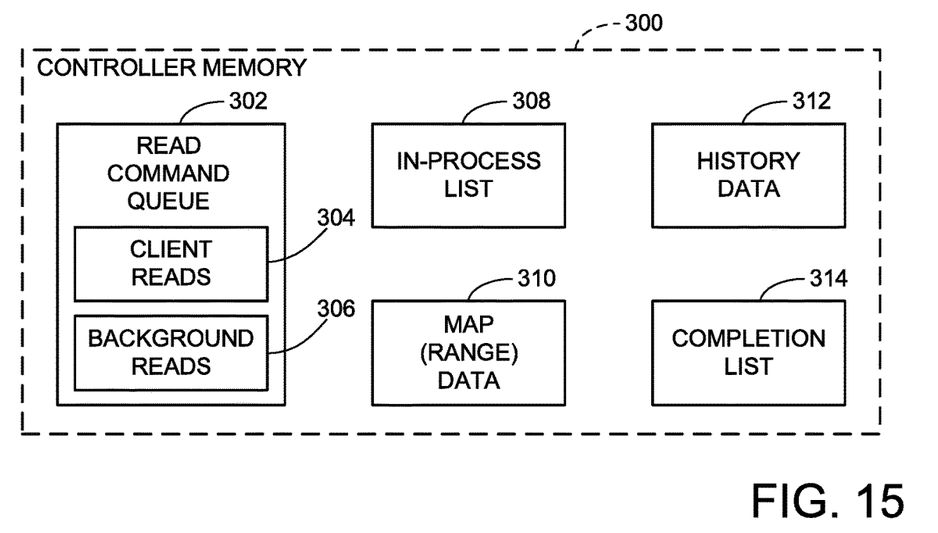
FIG. 15 depicts various data structures utilized by the read controller in some embodiments.

FIG. 15 shows a portion of a controller memory 300 of the SSD. The memory 300 can correspond to a portion of the local processor memory 120 in FIG. 2. FIG. 15 has been provided to illustrate various data structures that are generated and used by the read controller 230. These data structures include a read command queue 302 which lists all of the pending read commands, including client reads 304 and background reads 306. It will be noted that the read commands need not necessarily be physically separated into one or more separate queues, so long as all of the pending read commands can be quickly identified and evaluated.

An in-process list 308 identifies all of the read commands that are currently in the in-process phase 224 (FIG. 7). It is contemplated that each read command will likely only be resident in the in-process list for a relatively short period of time, depending on the readback effort required to recover the data. Nevertheless, it will be recalled that the in-process phase does not only describe the actual time that the flash is working on the read command, but also a preceding period of time during which the read command has been formatted and is ready to be sent to the FME, as well as a subsequent period of time during which the recovered data is being decoded, decompressed, decrypted, transferred, etc. Each time the scheduler has sufficiently prepared a read command that the command is now ready to be transferred to the FME, an entry is added to the in-process list 308 for that command.

A map (range) data block 310 represents data used to generate a search range for each in-process read command in the in-process list 308. History data 312 provides information regarding recent read history (including client reads and background reads), and a completion list 314 lists commands that have now been completed.

Figure 16:
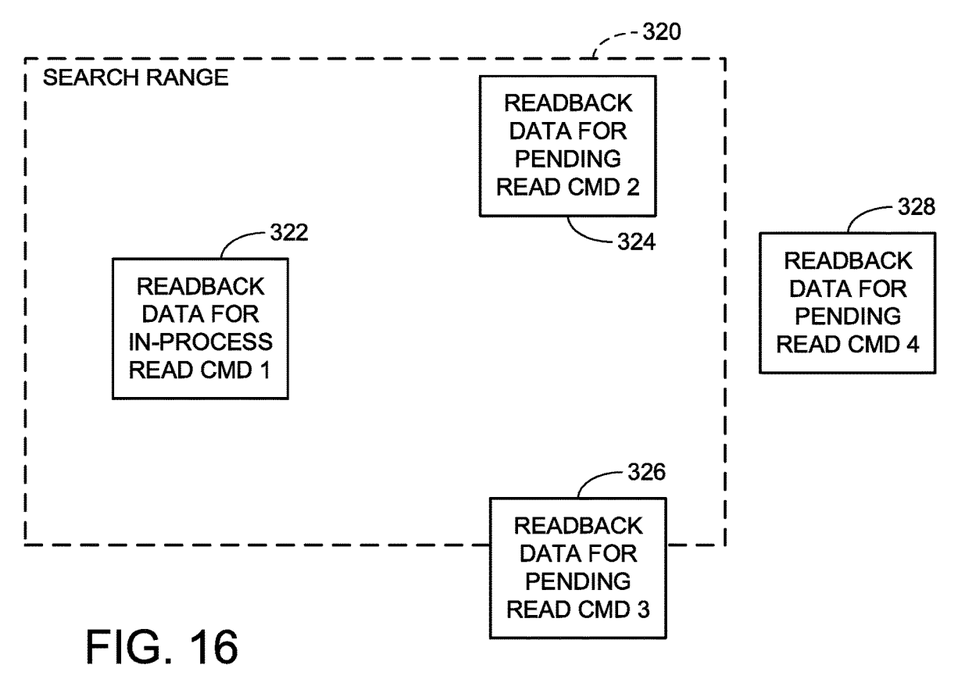
FIG. 16 shows a search range utilized by the read controller in evaluating in-process reads for expansion in accordance with some embodiments.

FIG. 16 shows a search range 320 generated from the blocks 310, 312 for a selected in-process read command. The in-process read command is referred to as a first read command (read cmd 1). The associated readback data for the first read command is represented by block 322. The search range 320 represents the physical and/or logical space for a search range surrounding the readback data 322. The extent of the box 320 can be sized based on a number of factors, including the history data.

The search range will cover physical locations that are easily accessed by the flash memory while the first read command is being serviced. For example, if the readback data 322 are located in a selected GCU (such as GCU X), then it may be efficient to identify any other pending read commands upon GCU X and proceed with an expanded read request to pull this additional data while the readback data 322 are being pulled. In another example, if there are other pending read commands to the same erasure block, die, plane, page, etc., such data may be pulled as well via an expanded read request.

A sequential read/write environment will tend to write data blocks to the flash with both physical and logical proximity. In this case, logical addressing can be used to set the search range. For example, if the requested readback data in block 322 is for LBAs 1000 through 1100, the search window 320 might include a search for pending reads that request LBAs 900-999, LBAs 1101-1200, etc.

Block 324 represents the readback data associated with a second read command (read cmd 2). Because block 324 falls entirely within the search range 320, the read controller 230 issues an expanded read request as described above that encompasses the data in blocks 322 and 324.

Block 326 shows another set of readback data associated with a third read command (read cmd 3). In this case, the readback data only partially falls within the search range. In this case, either that portion of the readback data in block 326 will be recovered, or the FME will be instructed to proceed with pulling all of the data in block 326 irrespective of location. Block 328 represents read data for a fourth read command (read cmd 4). Because block 328 falls outside of the search range 320, this command is processed separately rather than being included in the expanded read request.

Each of these strategies may be more effective under different circumstances. For example, if the portion of block 326 that falls outside of the search range 318 requires a different set of resources to complete (e.g., a different die set, etc.), it may make sense to do a partial pull and schedule a separate read for this other portion of the data. On the other hand, if the portion of block 326 that falls outside the search range 320 can be serviced using the same resources, it makes sense to go ahead and pull all of the data encompassed within block 320. The read controller 230 can be configured to take these and other considerations into account when formulating an expanded read request.

The processing carried out by the read controller 230 may include retrieving a first set of map data (see FIG. 5) to identify a first target location in the flash 210 at which the first set of readback data 332 is stored. This first target location is incorporated into the first in-process read command issued to the FME 208 (see e.g., field 276 in FIG. 13). The read controller will further proceed to retrieve a second set of map data to identify a second target location in the flash at which the second set of readback data 334 is stored.

The search range evaluation may include determining an intervening distance between the first and second target locations. For example, if this intervening distance falls within a selected threshold distance, the second command is determined to fall within the search range 320, and so the addresses for both the first and second target locations are included in the expanded search command (see e.g., field 288 in FIG. 14). Without limitation, this may include the first and second target locations sharing at least a selected one of a common die, plane, GCU, row or page within the flash. In this way, another efficient manner in which the read controller can operate is that, as each read command pending in the command queue is processed in turn, the target location can be compared to the preestablished search ranges for each of the in-process commands in the in-process list 308 (FIG. 15).

Figure 17:
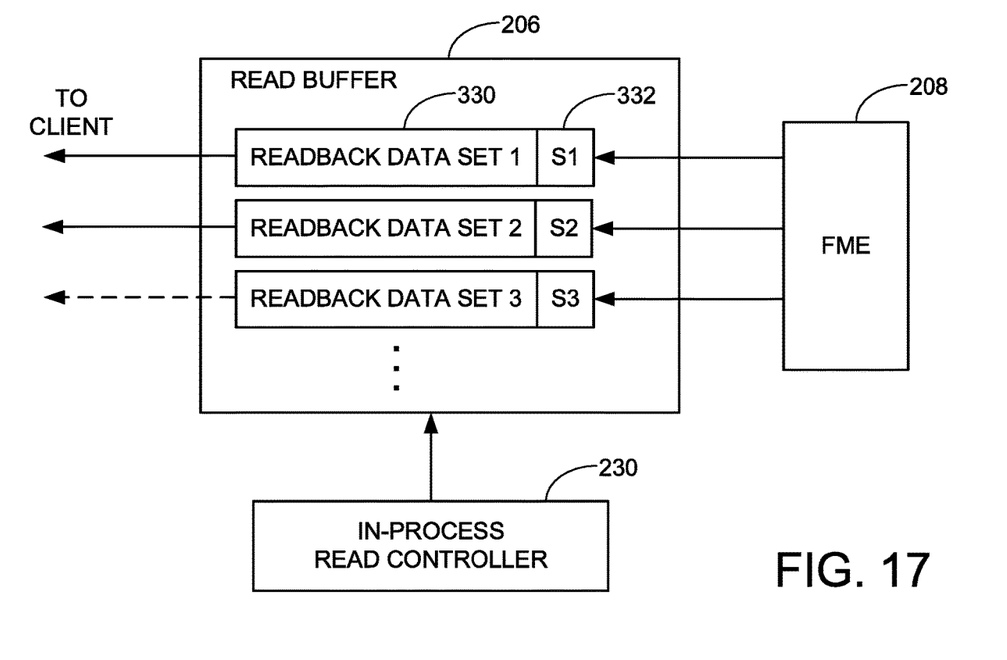
FIG. 17 depicts the read buffer of FIG. 6 in some embodiments.

FIG. 17 is a schematic representation of the read buffer 206 from FIG. 6 during in-process read consolidation processing. The read buffer 206 is shown to temporarily store readback data in the form of readback data sets 330. These are arbitrarily denoted as readback data sets 1-3, and may correspond to client reads, background reads or speculative data.

Each data set 330 has corresponding tracking and control data in the form of a status value 332. The status values are denoted as S1-S3, and may be stored with the readback data or in a separate table. The status values can be of any suitable bit length and can have any number of fields to record pertinent data associated with each set. The status values indicate specialized processing that may need to be carried out, an indication of the current status of the set, a retention time for the set, a linking value to another command/data set, etc. Without limitation, the first readback data set (data set 1) in FIG. 17 can correspond to the readback data in block 322 of FIG. 16, data set 2 can correspond to the readback data in block 324 of FIG. 16, and data set 3 can correspond to speculative data (e.g., additional data pulled within the search range 320). In this case, the controller forwards data sets 1 and 2 to complete the first and second commands, and retains data set 3 for a potential cache hit to satisfy an anticipated third client read command.

Referring again to FIG. 12. When the FME 208 receives an expanded read request, the FME performs the necessary internal operations to expand the requested data pull. The DMM sends status requests based on the expanded command, and the FME will not expect a separate status request for the initial in-process command.

At this point it will be noted that the in-process command consolidation discussed herein eliminates the need to perform pre-command consolidation during the pending phase. That is, instead of using resources to initially search the existing command queues to locate related commands, each read command is processed separately upon receipt and forwarded to the FME as normal. Consolidation opportunities are evaluated once the scheduler has committed to sending a particular command to the FME, significantly reducing the operational complexity of the search function. It will be recalled that in some cases, hundreds or even many thousands of commands can be queued, particularly in an NVMe environment. It would be counterproductive to wait, delay or pull back a given read command to combine it with another pending command. Instead, once a command is prepared and ready, the system evaluates a subset of local read commands to determine whether there is benefit to pulling additional data using the same resource set; if so, an expanded read request is sent after the initial in-process command is sent. This greatly simplifies processing requirements at both the DMM and FME levels.

Figure 18:
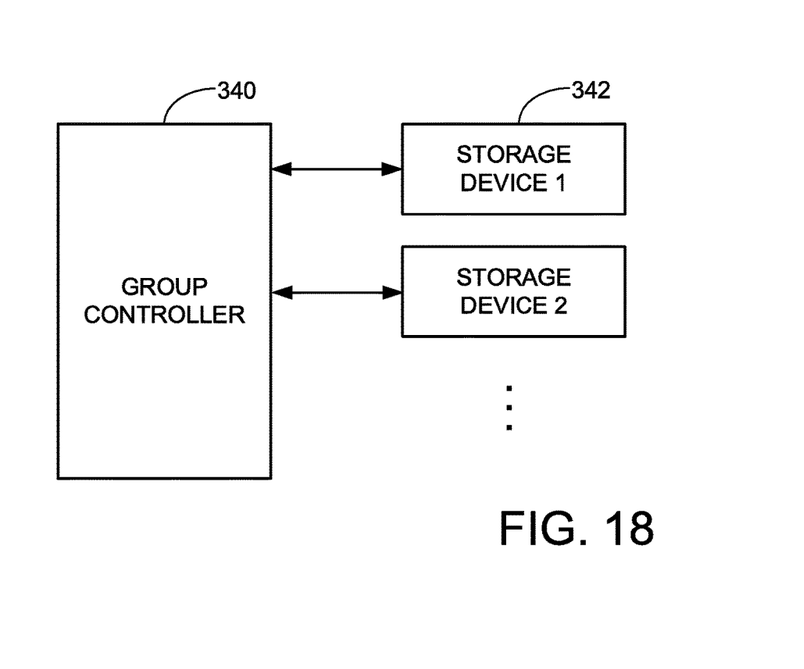
FIG. 18 shows a multi-device storage system that incorporates in-process read operations in further embodiments.

While the various embodiments discussed to this point have contemplated operation at a single storage device level, the processing can be expanded as required. FIG. 18 shows a group controller 340 that controls a number of storage devices 342, such as the SSDs 110 discussed above. In this embodiment, consolidations are handled at the group control level 340, including the issuance of read commands and expanded read requests to the respective devices 342.

While various embodiments presented herein have been described in the context of an SSD, it will be appreciated that the embodiments are not so limited. The various embodiments have particularly suitability for use in an NVMe environment, including one that supports deterministic (IOD) modes of operation in which specified levels of performance are guaranteed for selected intervals.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method, comprising:
   forwarding a first read command from a command queue to a non-volatile memory (NVM) to request retrieval of a first set of readback data;
   initiating execution of the first read command by the NVM;

generating a search range associated with the first set of readback data responsive to the forwarding of the first read command to the NVM;
applying the search range to the command queue to evaluate additional pending read commands in the command queue;
subsequently forwarding an expanded read command to the NVM during in-process execution of the first read command by the NVM, the expanded read command expanding the first read command to request retrieval of a second set of readback data operationally proximate the first set of readback data, the second set of readback data falling within the search range and associated with a second read command pending in the command queue; and
transferring, by the NVM to a read buffer, the first and second sets of readback data responsive to the expanded read command.

2. The method of claim 1, wherein the first and second read commands are characterized as client commands issued by at least one client device.

3. The method of claim 1, wherein the expanded read command requests retrieval of an expanded readback data set that includes the first set of readback data and the second set of readback data, and the expanded readback data set is transferred to the read buffer during the transferring step.

4. The method of claim 3, wherein the expanded readback data set further includes speculative readback data not associated with a pending read command in the command queue at the time of issuance of the expanded read command.

5. The method of claim 1, wherein the second set of readback data is operationally proximate to the first set of readback data on a basis that both the first and second sets of readback data are disposed in at least a selected one of a common die, plane, garbage collection unit (GCU), row or page within the NVM.

6. The method of claim 1, wherein the second set of readback data is operationally proximate to the first set of readback data on the basis that the first and second sets of readback data have sequential logical address intervals within a selected range.

7. The method of claim 1, wherein the first read command has a first unique command identification (ID) value, and wherein the expanded read command has a second unique command ID value and lists the first unique command ID value of the first read command.

8. The method of claim 1, wherein the first read command is a client read command issued from a selected client device, and wherein the second set of readback data is associated with a second client read command issued by the selected client device.

9. The method of claim 1, wherein the NVM is characterized as a flash memory comprising a plurality of dies arranged into die groups using a plurality of interconnecting channels, and wherein the first and second sets of readback data are stored on a selected die group and utilize a common set of resources for retrieval and transfer to the read buffer.

10. The method of claim 1, wherein the method further comprises retrieving first map data to identify a first target location in the NVM at which the first set of readback data is stored, using the first map data to format the first read command, retrieving second map data to identify a second target location in the NVM at which the second set of readback data is stored, and using the second map data to format the expanded read command responsive to an intervening distance between the first and second target locations within the NVM falling within a selected threshold distance.

11. An apparatus comprising:
a non-volatile memory (NVM);
a read buffer;
a command queue arranged as a data structure in a memory that lists a plurality of pending read commands to retrieve readback data from the NVM to the read buffer, the plurality of pending read commands comprising a first read command and a second read command; and
a controller configured to forward the first read command from the command queue to the NVM to request retrieval of a first set of readback data, and to subsequently forward an expanded read command to the NVM during in-process execution of the first read command by the NVM to request retrieval of an expanded set of readback data that includes the first set of readback data and a second set of readback data, the second set of readback data associated with the second read command in the command queue, the second read command present in the command queue when the first read command is forwarded to the NVM by the controller.

12. The apparatus of claim 11 wherein at least one of the first or second read commands are a client read command issued to the apparatus by an external client device.

13. The apparatus of claim 11, wherein at least one of the first or second read commands are a background read command generated by the controller to perform a background operation comprising at least a selected one of garbage collection, data relocation or calibration.

14. The apparatus of claim 11, wherein the expanded set of readback data comprises a parity data set that includes the first and second sets of readback data as well as additional data, the parity data set written across multiple dies of the NVM and protected by a set of parity outercode.

15. The apparatus of claim 11, wherein the expanded set of readback data comprises multiple pages of data stored to a row of memory cells each configured to store multiple bits of data.

16. The apparatus of claim 11, wherein the controller further operates to generate a search range associated with the first set of readback data responsive to the forwarding of the first read command to the NVM, and to generate the expanded read command responsive to a determination that at least a portion of the second set of readback data falls within the search range.

17. The apparatus of claim 11, wherein the expanded read command supersedes the first read command and includes an expanded command flag that causes the NVM to provide a command complete status for the expanded command without providing a separate command complete status for the first command.

18. A method, comprising:
forwarding a first read command from a command queue to a non-volatile memory (NVM) to request retrieval of a first set of readback data;
initiating execution of the first read command by the NVM;
subsequently forwarding an expanded read command to the NVM during in-process execution of the first read command by the NVM to supercede the first read command by requesting retrieval of the first set of readback data and additional data from the NVM operationally proximate to the first set of readback data, the additional data comprising a second set of readback data associated with a second read command pending in the command queue during execution of the first read command; and transferring, by the NVM to a read buffer, the first and second sets of readback data responsive to the expanded read command.

19. The method of claim 18, further comprising:

retrieving first map data to identify a first target location in the NVM at which the first set of readback data is stored;

using the first map data to format the first read command;

retrieving second map data to identify a second target location in the NVM at which the second set of readback data is stored; and using the second map data to format the expanded read command responsive to an intervening distance between the first and second target locations within the NVM falling within a selected threshold distance.

20. The method of claim 18, further comprising:

applying a search range to the command queue responsive to the forwarding of the first read command to the NVM; and generating the expanded read command responsive to a determination that at least a portion of the second set of readback data falls within the search range.

* * * * *